(12) United States Patent
Chen (10) Patent No.: US 7,506,890 B2
(45) Date of Patent: Mar. 24, 2009

(54) DEVICE FOR LIMITING SWIVEL OF A FRONT WHEEL OF A STROLLER

(75) Inventor: Shun-Min Chen, Taipei (TW)

(73) Assignee: Wonderland Nursery Goods Co., Ltd., Taipei (TW)

( * ) Notice: Subject to any disclaimer, the term of this patent is extended or adjusted under 35 U.S.C. 154(b) by 406 days.

(21) Appl. No.: 11/362,303

(22) Filed: Feb. 24, 2006

(65) Prior Publication Data

US 2007/0210544 A1   Sep. 13, 2007

(51) Int. Cl.
*B62B 7/00* (2006.01)
(52) U.S. Cl. .................................. 280/647; 280/47.38
(58) Field of Classification Search ................. 280/642, 280/647, 50, 47.25, 47.38, 62
See application file for complete search history.

(56) References Cited

U.S. PATENT DOCUMENTS

| 4,336,629 | A |   | 6/1982 | Jarvis, Jr. et al. ............. 16/35 R |
| 4,349,938 | A | * | 9/1982 | Fontana ....................... 16/35 R |
| 4,847,945 | A | * | 7/1989 | Schwartz et al. ............... 16/30 |
| 4,913,452 | A |   | 4/1990 | Zun ......................... 280/47.41 |
| 6,212,733 | B1 |   | 4/2001 | Yeh ........................... 16/35 R |
| 6,402,166 | B1 | * | 6/2002 | Chiu ........................ 280/47.38 |
| 6,871,380 | B2 | * | 3/2005 | Chen .......................... 16/35 R |
| 7,083,175 | B1 | * | 8/2006 | Liu .......................... 280/47.38 |
| 7,210,690 | B2 | * | 5/2007 | Tan .......................... 280/47.38 |
| 7,213,818 | B2 | * | 5/2007 | Chang ....................... 280/47.38 |
| 7,258,353 | B2 | * | 8/2007 | Liao ........................ 280/47.38 |
| 2001/0029643 | A1 |  | 10/2001 | Schroeder et al. ........... 16/35 R |
| 2004/0226134 | A1 |  | 11/2004 | Chen .......................... 16/35 R |

FOREIGN PATENT DOCUMENTS

GB    2 351 474 A   1/2001

* cited by examiner

*Primary Examiner*—Christopher P Ellis
*Assistant Examiner*—Brian Swenson
(74) *Attorney, Agent, or Firm*—Ladas & Parry, LLP (57) ABSTRACT

A device for limiting swivel of a wheel of a stroller includes a fork mounted with the wheel, a swivel-limiting unit, and a quick release unit. The swivel-limiting unit includes a connecting seat adapted to be disposed fixedly on a frame unit of the stroller, a limiting seat connected fixedly to the fork, and a control member disposed on the connecting seat and operable to extend into the limiting seat so as to prevent rotation of the fork relative to the connecting seat. The quick release unit includes a base disposed fixedly on the connecting seat, and a movable member disposed movably on the base and operable to move on the base so as to allow for removal of the fork from the swivel-limiting unit.

25 Claims, 10 Drawing Sheets

DEVICE FOR LIMITING SWIVEL OF A FRONT WHEEL OF A STROLLER

BACKGROUND OF THE INVENTION

1. Field of the Invention

This invention relates to a device for limiting the swivel of a front wheel, and more particularly to a device for limiting the swivel of a stroller front wheel, which is easy to operate and assemble/disassemble.

2. Description of the Related Art

Figure 1:
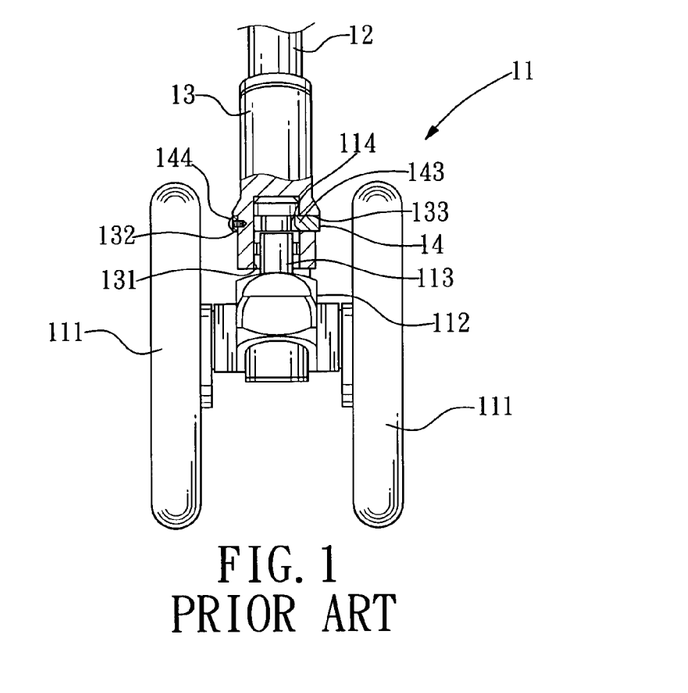
FIG. 1 a partly sectional view of a conventional front wheel assembly for a stroller.
Figure 2:
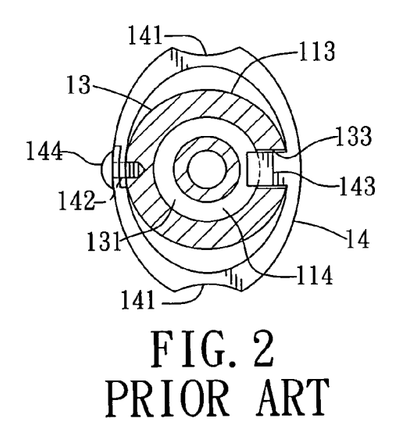
FIG. 2 is a fragmentary sectional view of the conventional front wheel assembly, illustrating how a sleeve and a post are interconnected by a generally elliptical retaining ring.

Referring to FIGS. 1 and 2, a conventional front wheel assembly 11 for a stroller includes two wheels 111, a coupling block 112 journalled between the wheels 111, and a post 113 extending upwardly from a center of the coupling block 112 and formed with an annular groove 114. A front frame 12 of the stroller is provided with a fixed upright sleeve 13, which has a lower end recess 131 for insertion of the post 113 thereinto. The sleeve 13 further has a transverse hole 133 formed in a lower end portion thereof and communicated with the recess 131. A generally elliptical retaining ring 14 is sleeved on the sleeve 13, and has two opposite operable portions 141, a hole 142, and a projection 143 opposite to the hole 142 and extending into the annular groove 114 of the post 113. A bolt 144 extends through the hole 142 in the retaining ring 14, and engages a threaded hole in the sleeve 13.

Figure 3:
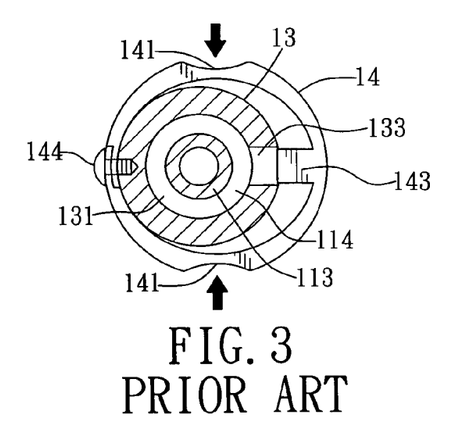
FIG. 3 is a fragmentary sectional view of the conventional front wheel assembly, illustrating how the retaining ring is operated so as to allow for removal of the post from the sleeve.

When it is desired to remove the front wheel assembly 11 from the sleeve 13, the operable portions 141 are pressed toward each other so as to remove the projection 143 of the retaining ring 14 from the annular groove 114 of the post 113, as shown in FIG. 3. This allows for removal of the front wheel assembly 11 from the sleeve 13. However, a significant force must be applied by the user so that the operable portions 141 are displaced by an amount sufficient to remove the projection 143 from the annular groove 114. Furthermore, there is no swivel-limiting structure for the front wheel assembly 11. Such a configuration results in random rotation of the front wheel assembly 11 when moving on an uneven road surface, thereby increasing difficulties with respect to controlling the stroller.

SUMMARY OF THE INVENTION

The object of this invention is to provide a device for limiting the swivel of a stroller front wheel, which can be easily mounted to and removed from a stroller frame.

According to this invention, a device for limiting swivel of a wheel of a stroller includes a fork mounted with the wheel, a swivel-limiting unit, and a quick release unit. The swivel-limiting unit includes a connecting seat adapted to be disposed fixedly on a frame unit of the stroller, a limiting seat connected fixedly to the fork, and a control member disposed on the connecting seat and operable to extend into the limiting seat so as to prevent rotation of the fork relative to the connecting seat. The quick release unit includes a base disposed fixedly on the connecting seat, and a movable member disposed movably on the base and operable to move on the base so as to allow for removal of the fork from the swivel-limiting unit.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Before the present invention is described in greater detail in connection with the preferred embodiments, it should be noted that similar elements and structures are designated by like reference numerals throughout the entire disclosure.

Figure 4:
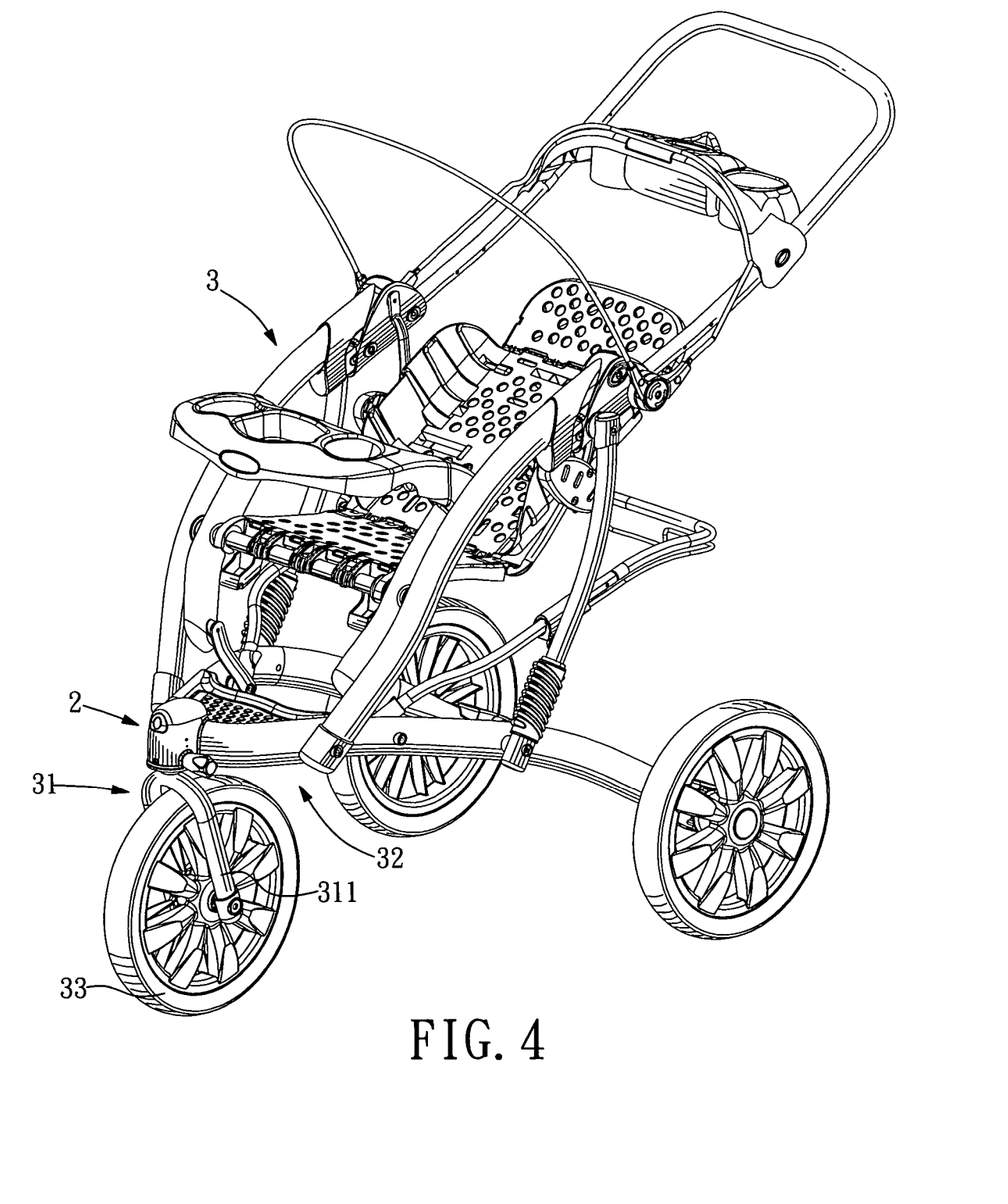
FIG. 4 is a perspective view of a stroller mounted with the first preferred embodiment of a device for limiting the swivel of a front wheel according to this invention.
Figure 5:
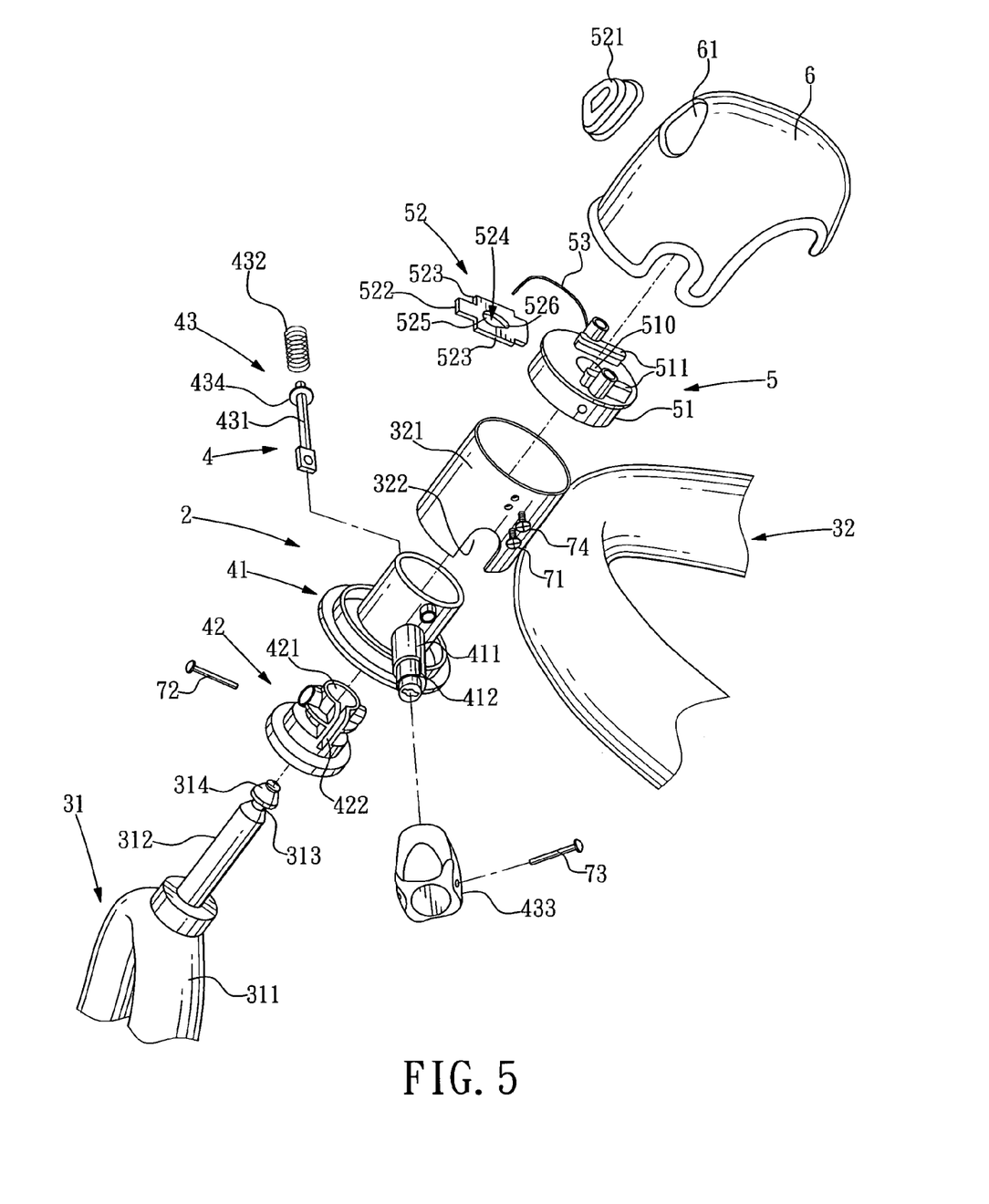
FIG. 5 is an exploded perspective view of the first preferred embodiment.

Referring to FIGS. 4 and 5, the first preferred embodiment of a device 2 according to this invention is adapted for limiting the swivel of a front wheel 33 of a frame unit of a stroller 3. The device 2 is disposed between the front wheel 33 and a footrest tube 32 of the stroller 3, and includes a front fork 31 having a connecting portion 311 mounted with the front wheel 33, and a retaining portion 312 disposed above and connected fixedly to the connecting portion 311. Alternatively, the device 2 may be disposed between the front wheel 33 and a leg (not shown) of the stroller 3. The retaining portion 312 has an upper end portion that is formed with an annular groove to define a neck 313 and a head 314 disposed above the neck 313. The footrest tube 32 includes a fixed sleeve 321 having open upper and lower ends. An annular lower end edge of the sleeve 321 is formed with a notch 322.

Figure 6:
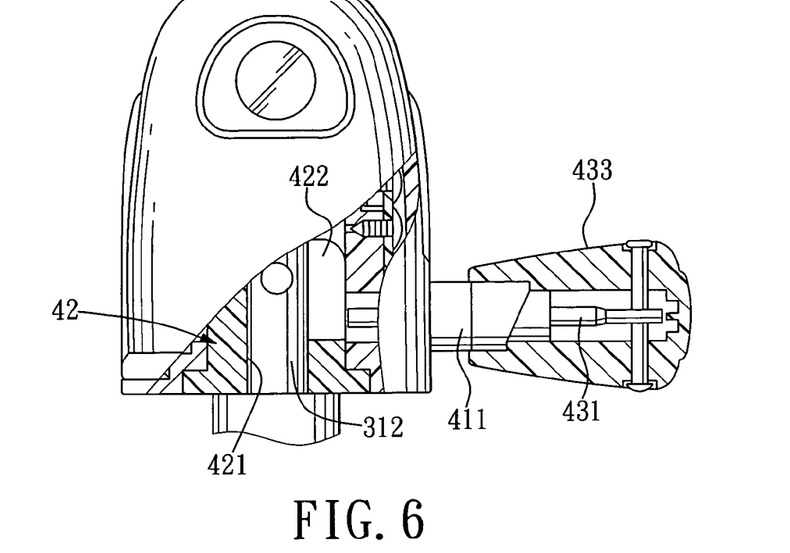
FIG. 6 is a partly sectional view of the first preferred embodiment.
Figure 7:
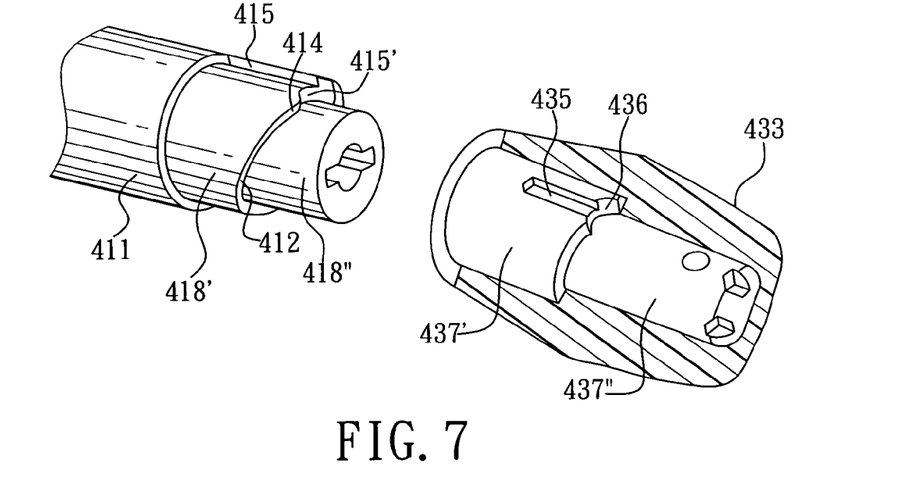
FIG. 7 is a partly sectional, exploded perspective view of an extension tube and a rotating sleeve of the first preferred embodiment.

The device 2 further includes a swivel-limiting unit 4, a quick release unit 5, and an outer housing 6. The swivel-limiting unit 4 includes a connecting seat 41, a limiting seat 42, and a control member 43. With further reference to FIGS. 6 and 7, the connecting seat 41 is tubular, and has an annular outer surface that is formed with an extension tube 411 connected fixedly thereto. The connecting seat 41 is sleeved on and is connected fixedly to the sleeve 321 of the footrest tube 32 by a screw 71. The extension tube 411 extends through the notch 322 in the sleeve 321. With additional reference to FIGS. 7, 8, and 9, the extension tube 411 is formed with an outer surface including a first slideway area 418', a second slideway area 418" having an outer diameter smaller than that of the first slideway area 418', and a curved connecting shoulder 412 defined between the first and second slideway areas 418', 418". The curved connecting shoulder 412 has opposite inner and outer axial ends 413, 414, at each of which the extension tube 411 is formed with a stop edge 415 and a recess 415'. The connecting seat 41 is further formed with a passage unit 416 aligned and communicated with the extension tube 411. The extension tube 411 has an inner surface that is formed with a stop surface or shoulder 417. The limiting seat 42 has a receiving space 421 for extension of the retaining portion 312 of the front fork 31 therethrough and a periphery formed with a limiting groove 422. The retaining portion 312 of the front fork 31 is connected fixedly to the limiting seat 42 by a rivet 72. The control member 43 includes a locking rod 431, a resilient member 432, and a rotating sleeve 433. The locking rod 431 is formed with a stop portion 434 in the form of a radially and outwardly extending flange, and is movable within the extension tube 411 between a locking position shown in FIG. 9 and a release position shown in FIG. 8. In the locking position, the locking rod 431 is inserted into the limiting groove 422 in the limiting seat 42 so as prevent rotation of an assembly of the limiting seat 42 and the front fork 31 relative to an assembly of the connecting seat 41, the sleeve 321, and the footrest tube 32. In the release position, the locking rod 431 is removed from the limiting groove 422 so as to allow for rotation of the assembly of the limiting seat 42 and the front fork 31 relative to the assembly of the connecting seat 41, the sleeve 321, and the footrest tube 32. The resilient member 432 is configured as a coiled compression spring, and is sleeved on the locking rod 431 between the stop surface 417 of the extension tube 411 and the stop portion 434 of the locking rod 431. As such, the locking rod 431 is biased toward the locking position. The rotating sleeve 433 is sleeved on an end of the extension tube 411. An end of the locking rod 431 extends into and is connected fixedly to the rotating sleeve 433 by a rivet 73 so as to allow for synchronous rotation and movement of the rotating sleeve 433 and the locking rod 431 relative to the extension tube 411. The rotating sleeve 433 is formed with a pair of interconnected annular first and second inner surfaces 437', 437" having different inner diameters. The first inner surface 437' is adjacent to the extension tube 411, and is formed with an axially extending stop rib 435 at an end thereof adjacent to the second inner surface 437". The stop rib 435 is movable on the first slideway area 418' of the outer surface of the extension tube 411 between the stop edges 415 (only one is shown in FIG. 7). Therefore, the rotational angle of the rotating sleeve 433 is limited. The second inner surface 437" has an inner diameter smaller than that of the first inner surface 437', and is formed with a projection 436 movable along the curved connecting shoulder 412 of the extension tube 411. The resilient member 432 biases the projection 436 to contact the curved connecting shoulder 412. As such, the rotating sleeve 433 is operable to rotate about the extension tube 411 so as to move the projection 436 along the curved connecting shoulder 412, thereby moving the locking rod 431 to the locking position. Hence, an end of the locking rod 431 engages the limiting groove 422 in the limiting seat 42. This prevents rotation of the front fork 31 relative to the connecting seat 41, and therefore limits the swivel of the front wheel 33.

When the projection 436 moves to the inner or outer axial ends 413, 414 of the curved connecting shoulder 412, it engages the corresponding recess 415', and the rib 435 comes into contact with the corresponding stop edge 415. As such, positioning of the projection 436 at the inner and outer axial ends 413, 414 can be maintained.

Figure 10:
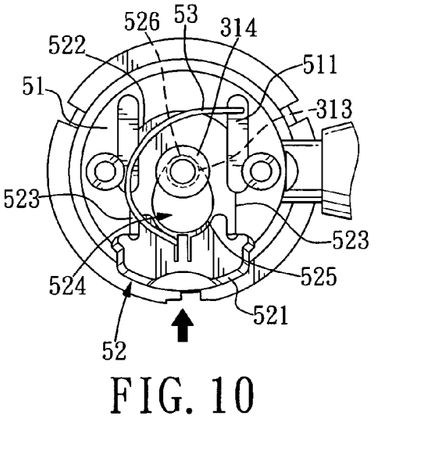
FIG. 10 is a fragmentary top view of the first preferred embodiment, wherein an outer housing is removed for better illustration of a base and a movable plate and wherein a touch control button is not actuated.
Figure 11:
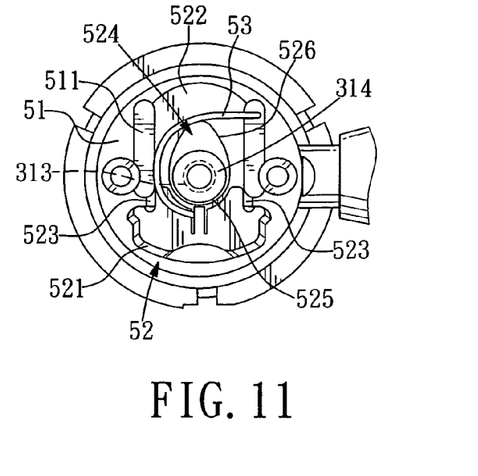
FIG. 11 is a fragmentary top view of the first preferred embodiment, wherein the outer housing is removed and wherein the touch control button is operated so as to allow for removal of the front wheel from the connecting seat.

The quick release unit 5 includes a base 51, a movable member 52, and a return member 53 in the form of a curved reed spring. The base 51 is disposed above and connected fixedly to the sleeve 321 by a screw 74, and has a hole 510 for extension of the retaining portion 312 of the front fork 31 therethrough. A top surface of the base 51 is formed with two spaced-apart parallel guide rails 511. The movable member 52 includes a touch control button 521 operable to move horizontally on the base 51, and a movable plate 522 driven by the touch control button 521 to move horizontally on the base 51 when the touch control button 521 is operated. The movable plate 522 is disposed between the guide rails 511, and has two opposite wing portions 523 in slidable contact with the guide rails 511, respectively. Thus, the movable plate 522 is guided to move on the base 51 along a direction. The movable plate 522 is formed with a hole 524 that engages the neck 313 of the front fork 31 and that has a wide hole portion 525 and a narrow hole portion 526. The wide hole portion 525 is sized so as to allow for movement of the head 314 of the front fork 31 therethrough. The narrow hole portion 526 is sized so as to prevent movement of the head 314 of the front fork 31 therethrough. The return member 53 biases the movable plate 522 to a position whereat the neck 313 of the front fork 31 engages the narrow hole portion 526, as shown in FIG. 10, so as to prevent removal of the front fork 31 from the swivel-limiting unit 4. The touch control button 521 is operable to move the movable plate 522 on the base 51 so as to engage the neck 313 with the wide hole portion 525 of the hole 524 in the movable plate 522, as shown in FIG. 11, thereby allowing for removal of the front fork 31 from the swivel-limiting unit 4.

The outer housing 6 has a hole 61 formed therethrough. The swivel-limiting unit 4 and the quick release unit 5 are disposed within the outer housing 6 such that the touch control button 521 is disposed within the hole 61 in the outer housing 6.

During assembly, first, the resilient member 432 is sleeved on the locking rod 431 such that an end of the resilient member 432 abuts against the stop portion 434. An assembly of the resilient member 432 and the locking rod 431 is inserted into the passage unit 416 in the connecting seat 41 and the extension tube 411 such that an end of the locking rod 431 extends from the extension tube 411. Thus, the resilient member 432 is disposed between the stop portion 434 and the stop surface 417. The rotating sleeve 433 is sleeved on the end of the locking rod 431, and is connected fixedly to the same by the rivet 73. As such, the rib 435 and the projection 436 are located respectively on the first and second slideway areas 418', 418" of the outer surface of the extension tube 411. The limiting seat 42 is sleeved on and connected fixedly to the retaining portion 312 of the front fork 31 by the rivet 72, and subsequently is placed upwardly into the connecting seat 41. An assembly of the connecting seat 41, the limiting seat 42, and the front fork 31 is placed upwardly into the sleeve 321 of the footrest tube 32 such that the extension tube 411 engages the notch 322 in the sleeve 321. The connecting seat 41 is connected fixedly to the sleeve 321 by the screw 71. The retaining portion 312 of the front fork 31 is inserted through the hole 524 in the movable plate 522. The base 51 is placed downwardly into and connected fixedly to the sleeve 321 by the screw 74. Finally, the outer housing 6 is sleeved on an upper end of the sleeve 321 such that the touch control button 521 is disposed within the hole 61 in the outer housing 6.

Figure 8:
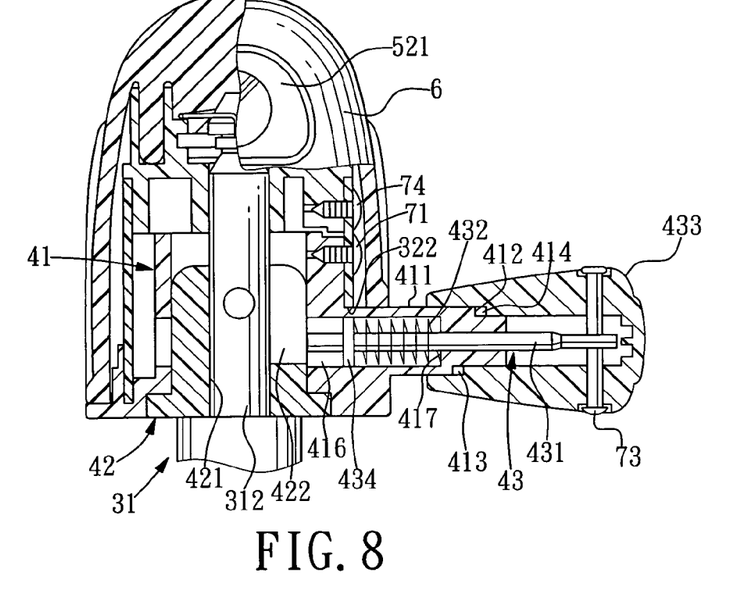
FIG. 8 is a partly sectional view of the first preferred embodiment, illustrating how a locking rod is removed from a limiting groove in a limiting seat so as to allow for rotation of a front fork relative to a connecting seat and, thus, a footrest tube.

Referring to FIG. 8, when the locking rod 431 does not engage the limiting groove 422 in the limiting seat 42, rotation of the front fork 31 (see FIG. 5) and the front wheel 33 (see FIG. 4) relative to the footrest tube 32 (see FIG. 5) is allowed. In this state, the resilient member 432 is not compressed.

Figure 9:
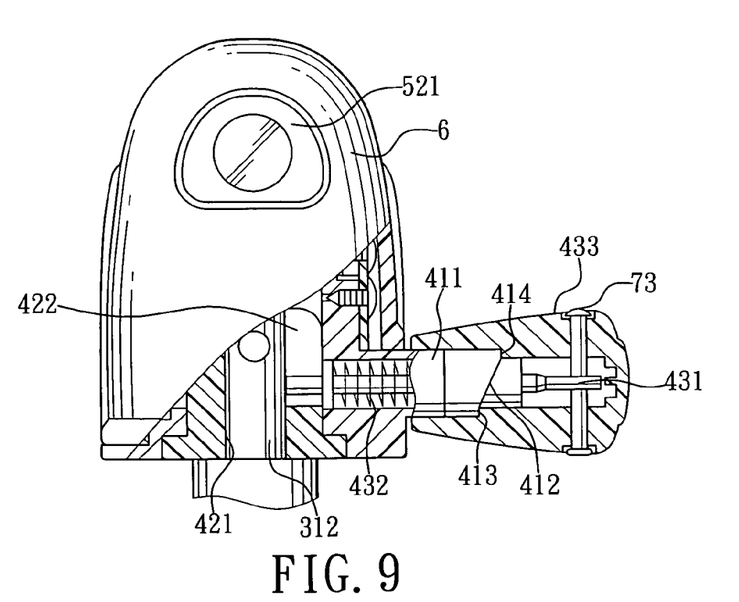
FIG. 9 is a partly sectional view of the first preferred embodiment, illustrating how the locking rod is inserted into the limiting groove so as to prevent rotation of the front fork relative to the connecting seat.

Referring to FIG. 9, when the locking rod 431 engages the limiting groove 422 in the limiting seat 42, rotation of the front fork 31 (see FIG. 5) and the front wheel 33 (see FIG. 4) relative to the footrest tube 32 (see FIG. 5) is prevented. In this state, the resilient member 432 is compressed.

Figure 12:
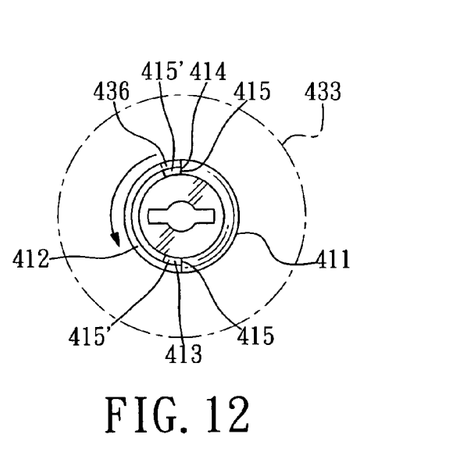
FIGS. 12 and 13 are schematic views illustrating how a projection is positioned at outer and inner axial ends of a curved connecting shoulder of the first preferred embodiment.

Referring to FIGS. 7, 10 and 12, when the touch control button 521 is not actuated, a wall of the movable plate 522 defining the narrow hole portion 526 engages the neck 313, the rib 435 and the projection 436 engage respectively the stop edge 415 and the recess 415' that are disposed at the outer axial end 414 of the curved connecting shoulder 412.

Figure 13:
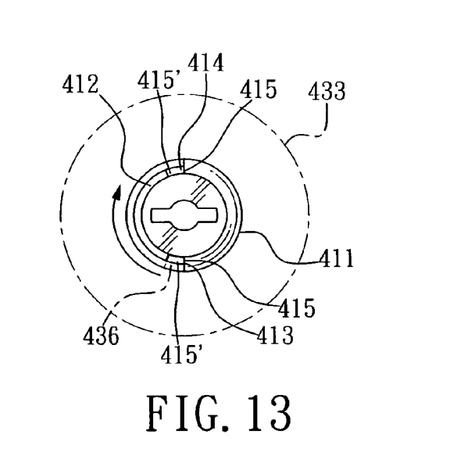

Referring to FIGS. 7, 9, and 13, when it is desired to limit the swivel of the front wheel 33 (see FIG. 4), the rotating sleeve 433 is rotated about the extension tube 411 so as to engage the rib 435 and the projection 436 with the stop edge 415 and the recess 415' that are disposed at the inner axial end 413 of the curved connecting shoulder 412. Hence, the locking rod 431 engages the limiting groove 422 in the limiting seat 42.

Referring to FIGS. 4, 5, and 11, when it is desired to remove the front wheel 33 from the footrest tube 32, a push force is applied to the touch control button 521 to move the movable plate 522 on the base 51 against the biasing action of the return member 53 so as to engage the neck 313 with the wide hole portion 525 of the hole 524 in the movable plate 522, thereby allowing for removal of the front wheel 33. When the push force is released, the return member 53 returns the movable plate 522 and the touch control button 521 to the positions shown in FIG. 10.

Figure 14:
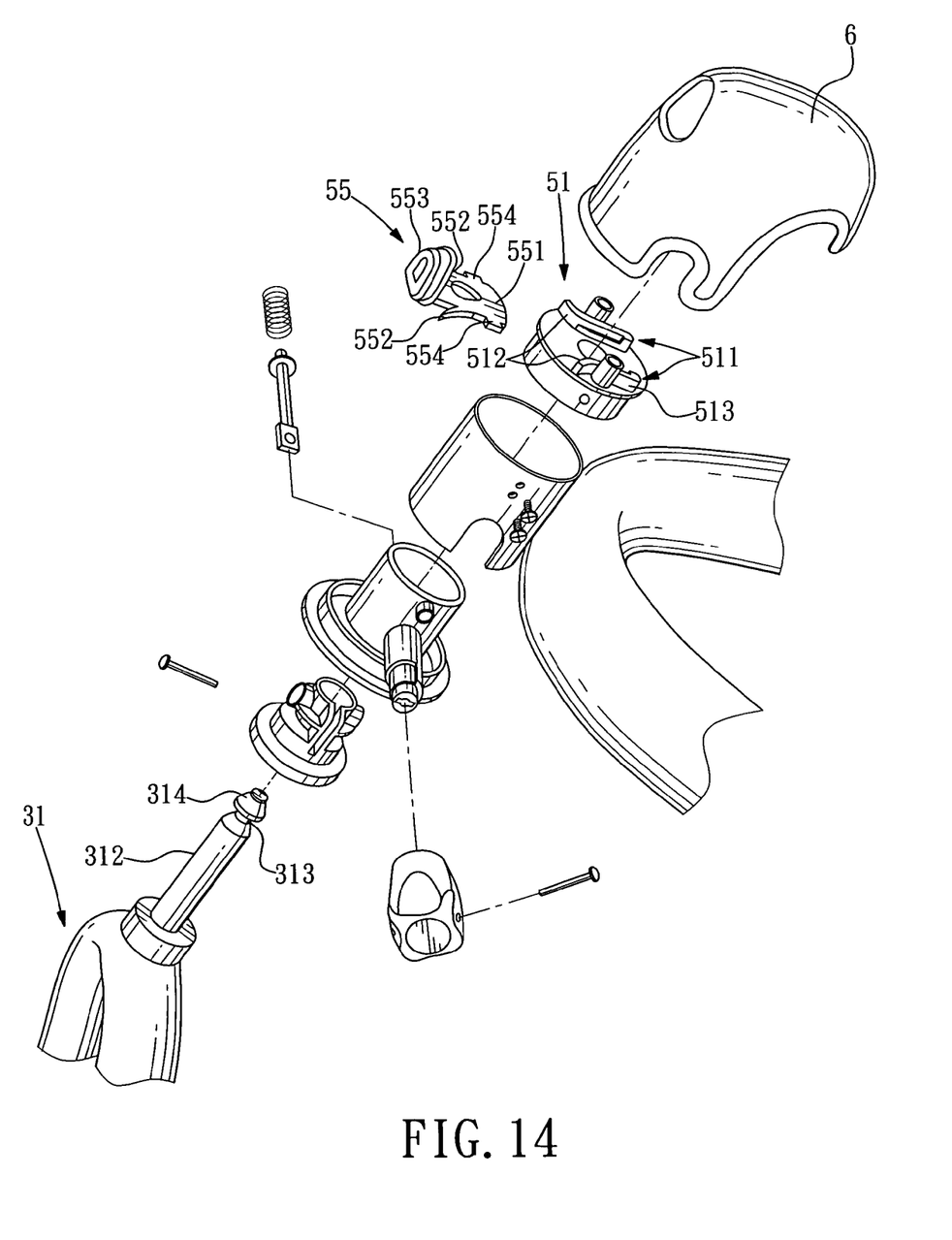
FIG. 14 is an exploded perspective view of the second preferred embodiment of a device for limiting the swivel of a front wheel of a stroller according to this invention.

FIG. 14 shows the second preferred embodiment of this invention, which includes a modified quick release unit 5. The modified quick release unit 5 includes a base 51 and a movable member 55. The movable member 55 includes a movable plate 551 and a touch control button 553 that are formed integrally with each other. The base 51 has a top surface that is formed with two guide rails 511, each of which has a curved front rail portion 512 and a straight rear rail portion 513. The movable plate 551 has two curved integral arms 552 extending respectively from two sides thereof and serving as reed springs, and two wing portions 554 extending from two opposite sides of an intermediate portion of the movable plate 551. The arms 552 are in slidable contact with the curved front rail portions 512, respectively. The wing portions 554 are in slidable contact with the straight rear rail portions 513, respectively.

Figure 15:
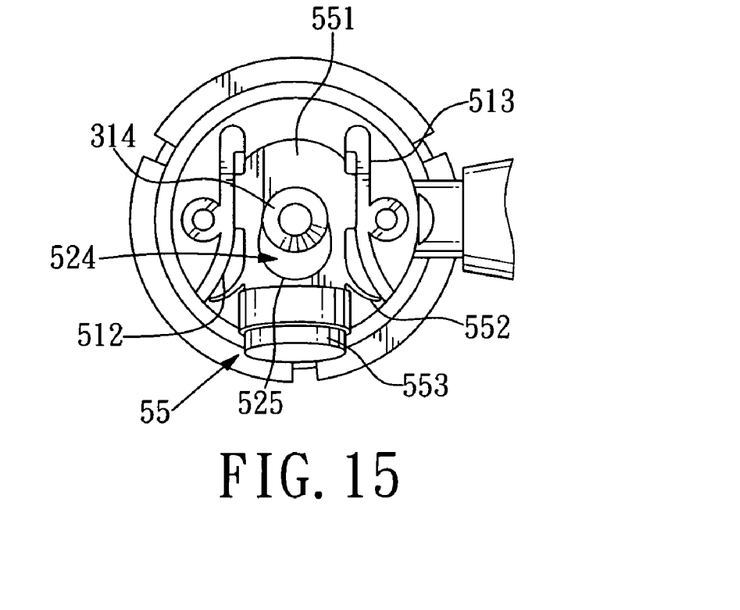
FIG. 15 is a fragmentary top view of the second preferred embodiment when a touch control button is not actuated, wherein an outer housing is removed for better illustration of a base and a movable plate.
Figure 16:
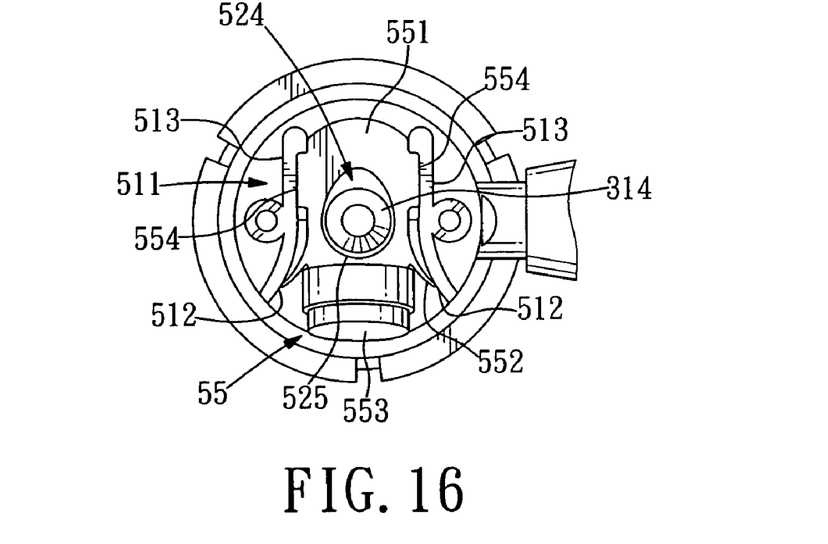
FIG. 16 is a fragmentary top view of the second preferred embodiment, wherein the outer housing is removed and wherein the touch control button is operated.

When the touch control button 553 is not actuated, the arms 552 engage respectively front ends of the curved front rail portions 512, as shown in FIG. 15. This prevents removal of the front fork 31. A push force can be applied to the touch control button 553 so as to move the arms 552 to contact intermediate portions of the curved front rail portions 512, as shown in FIG. 16. As such, removal of the front fork 31 is allowed, and the arms 552 deform so as to store a restoration force. Subsequently, when the push force is released, the restoration force of the arms 552 returns the movable plate 551 and the touch control button 553 to the positions shown in FIG. 15.

Figure 17:
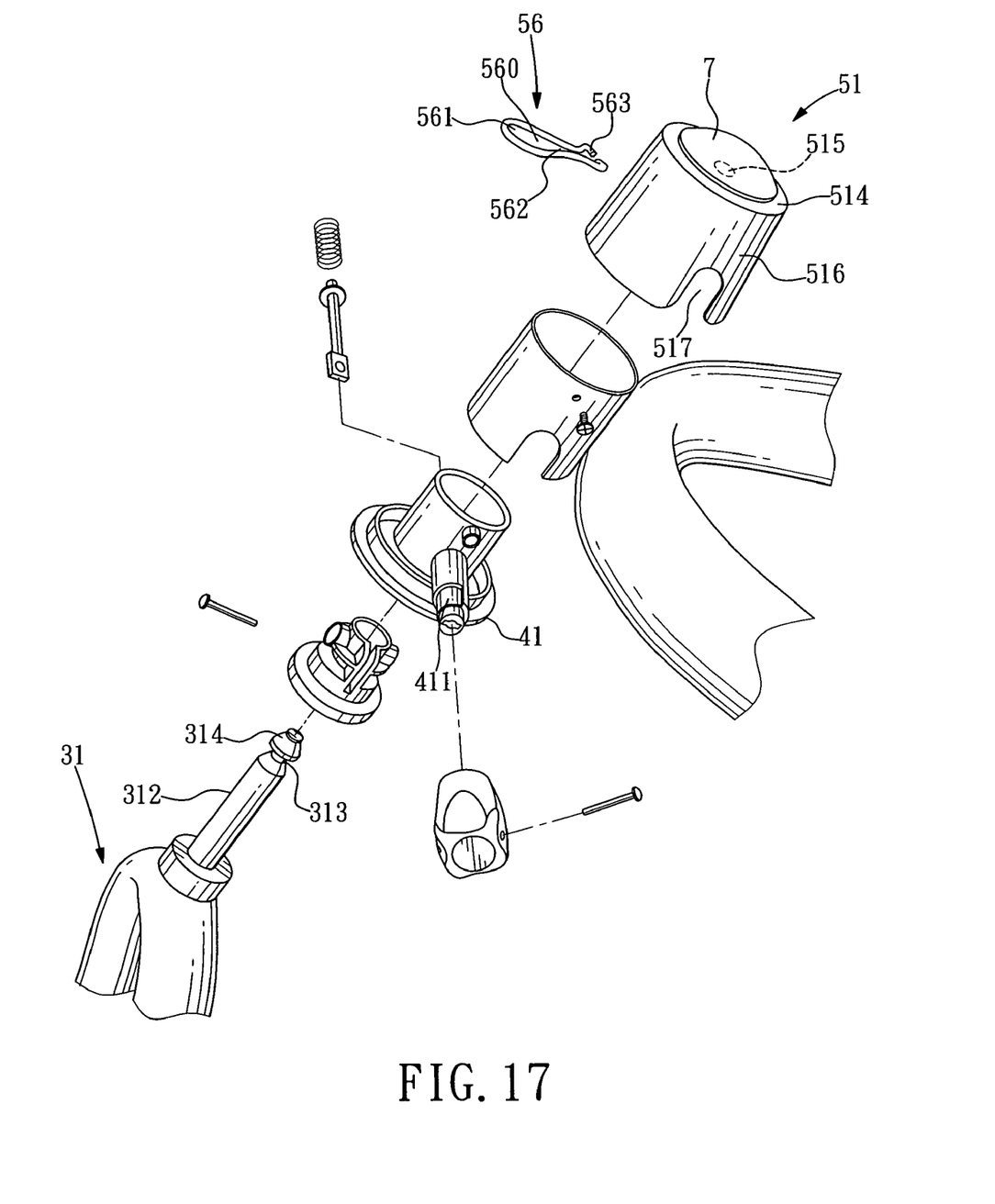
FIG. 17 is an exploded perspective view of the third preferred embodiment of a device for limiting the swivel of a front wheel of a stroller according to this invention.
Figure 18:
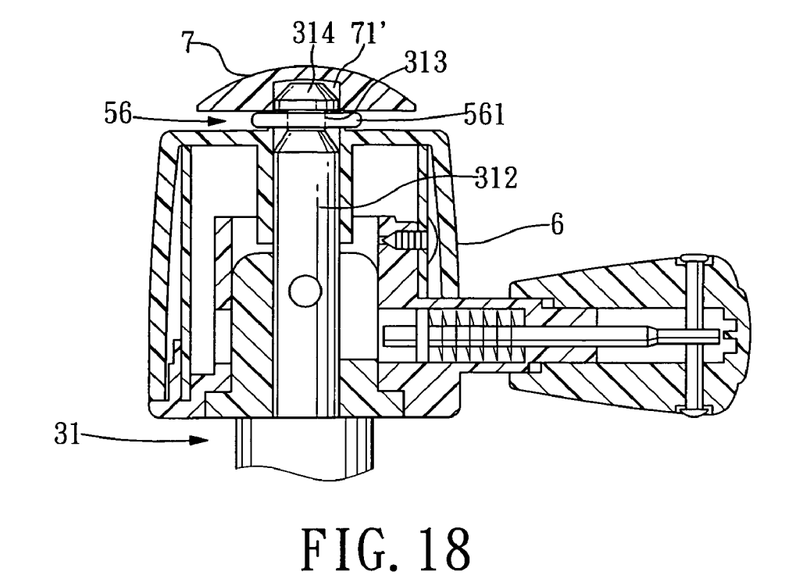
FIG. 18 is a sectional view of the third preferred embodiment.
Figure 19:
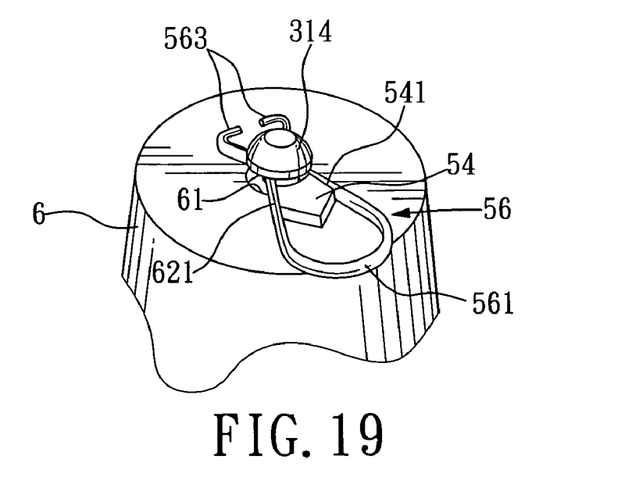
FIG. 19 is a fragmentary perspective view of the third preferred embodiment.

Referring to FIGS. 17, 18, and 19, the quick release unit 5 and the outer housing 6 can be replaced with an assembly of a base 51, a movable member 56, and a top cap 7. The base 51 includes a top wall 514 formed with a hole 515, and an annular surrounding wall 516 extending integrally and downwardly from a periphery of the top wall 514 and disposed around a portion of the connecting seat 41. The surrounding wall 516 has an annular lower end edge formed with a notch 517 that engages fittingly the extension tube 411 of the connecting seat 41. A guide block 54 is disposed fixedly on the top wall 514 of the base 51, and has a tapered guiding portion 541. The movable member 56 is configured as a clip defining a neck-confining space 560. The neck-confining space 560 engages the neck 313, and has a wide portion 561 sized to allow for movement of the head 314 of the front fork 31 therethrough, and a narrow portion 562 sized to prevent movement of the head 314 of the front fork 31 therethrough.

The tapered guiding portion 541 of the guide block 54 engages fittingly a portion of the neck-confining space 560 so as to bias the movable member 56 to a position whereat the neck 313 engages the narrow portion 562 of the neck-confining space 560 and where the neck 313 abuts against the guide block 54 so as to prevent removal of the front fork 31 from the connecting seat 41. A top cap 7 has a lower end surface that is formed with a hole 71'. The retaining portion 312 of the front fork 31 extends through the hole 515 in the base 51, and has a top end press fitted within the hole 71' in the top cap 7. The top cap 7 cooperates with two aligned straight ends 563 of the movable member 56 so as to prevent removal of the movable member 56 from the guide block 54. The straight ends 563 of the movable member 56 are spaced apart from each other by a distance that is smaller than the diameter of the neck 313 so as to prevent movement of the neck 313 through a space between the straight ends 563.

A push force can be applied to the movable member 56 so as to move on the top wall 514 of the base 51, thereby engaging the neck 313 with the wide portion 561 of the neck-confining space 560. This allows for removal of the front fork 31 from the connecting seat 41. When the push force is released, the movable member 56 returns to the position shown in FIG. 19 by the biasing action thereof. As such, the front fork 31 can be easily mounted to and removed from the connecting seat 41.

With this invention thus explained, it is apparent that numerous modifications and variations can be made without departing from the scope and spirit of this invention. It is therefore intended that this invention be limited only as indicated by the appended claims.

I claim:

1. A device for limiting swivel of a wheel of a stroller, said stroller including a frame unit, said device for limiting swivel comprising:

a fork adapted to be mounted with the wheel;
a swivel-limiting unit including
a connecting seat adapted to be disposed fixedly on the frame unit,
a limiting seat connected fixedly to said fork, and
a control member disposed on said connecting seat and operable to extend into said limiting seat so as to prevent rotation of said fork relative to said connecting seat; and a quick release unit including
a base disposed fixedly on said connecting seat, and
a movable member disposed movably on said base and operable to move on said base so as to allow for removal of said fork from said swivel-limiting unit.

2. The device for limiting swivel as claimed in claim 1, wherein said movable member includes a touch control button operable to move horizontally on said base, and a movable plate driven by said touch control button to move horizontally on said base when said touch control button is operated.

3. The device for limiting swivel as claimed in claim 2, wherein said connecting seat of said swivel-limiting unit is tubular, and has an annular outer surface that is formed with an extension tube, said control member including a locking rod movable within said extension tube between a locking position and a release position, a resilient member sleeved on said locking rod so as to bias said locking rod to said locking position to thereby prevent rotation of said fork relative to said connecting seat, and a rotating sleeve sleeved rotatably on said extension tube and operable to move said locking rod to a selected one of said locking position and said release position.

4. The device for limiting swivel as claimed in claim 3, wherein said fork has a connecting portion mounted with the wheel, and a retaining portion disposed above and connected fixedly to said connecting portion, said limiting seat having a receiving space adapted to permit extension of said retaining portion of said fork therethrough, and a periphery formed with a limiting groove, said locking rod being inserted into said limiting groove in said limiting seat when said locking rod is disposed in said locking position, said locking rod being removed from said limiting groove in said limiting seat when said locking rod is disposed in said release position.

5. The device for limiting swivel as claimed in claim 4, wherein said retaining portion of said fork has an upper end portion that is formed with an annular groove to define a neck and a head disposed above said neck, said base having a hole for extension of said retaining portion of said fork therethrough; and
said movable plate is formed with a hole that engages said neck of said fork and that has a wide hole portion sized so as to allow for movement of said head of said fork therethrough, and a narrow hole portion sized so as to prevent movement of said head of said fork therethrough, said movable plate being biased to a position whereat said neck engages said narrow hole portion so as to prevent removal of said fork from said swivel-limiting unit, said touch control button being operable to move said movable plate on said base so as to engage said wide hole portion of said hole in said movable plate with said neck, thereby allowing for removal of said fork from said swivel-limiting unit.

6. The device for limiting swivel as claimed in claim 5, wherein said quick release unit further includes a curved reed spring disposed between said base and said movable plate so as to bias said movable plate to a position whereat said neck engages said narrow hole portion of said hole in said movable plate, said base having a top surface that is formed with two spaced-apart parallel guide rails, said movable plate being disposed between said guide rails and having two opposite wing portions in slidable contact with said guide rails, respectively, so as to guide movement of said movable plate on said base along a direction.

7. The device for limiting swivel as claimed in claim 5, wherein said base includes:
a top wall;
an annular surrounding wall extending integrally and downwardly from a periphery of said top wall and disposed around a portion of said connecting seat, said surrounding wall having an annular lower end edge formed with a notch that engages fittingly said extension tube of said connecting seat; and
a guide block disposed fixedly on said top wall and having a tapered guiding portion; said movable member being configured as a clip defining a neck-confining space, which engages said neck and which has a wide portion sized to allow for movement of said head of said fork therethrough, and a narrow portion sized to prevent movement of said head of said fork therethrough, said tapered guiding portion of said guide block engaging fittingly a portion of said neck-confining space so as to bias said clip to a position whereat said neck engages said narrow portion of said neck-confining space so as to prevent said fork from said connecting seat, said clip being operable to move on said base so as to engage said neck with said wide portion of said neck-confining space, thereby allowing for removal of said fork from said connecting seat.

8. The device for limiting swivel as claimed in claim 7, further comprising a top cap having a lower end surface that is formed with a hole, said top wall of said base is formed with a hole, said retaining portion of said fork extending through said hole in said top wall and having a top end press fitted within said hole in said top cap so as to prevent removal of said clip from said guide block.

9. The device for limiting swivel as claimed in claim 3, wherein said locking rod is formed with a stop portion, said connecting seat having a passage unit and a stop surface, said extension tube extending into and fixed within said passage unit in said connecting tube, said resilient member being disposed between said stop portion of said locking rod and said stop surface of said connecting seat.

10. The device for limiting swivel as claimed in claim 3, wherein said extension tube is formed with an outer surface including a first slideway area, a second slideway area having an outer diameter smaller than that of said first slideway area, and a curved connecting shoulder defined between said first and second slideway areas and having opposite inner and outer axial ends, said rotating sleeve being formed with a pair of interconnected annular inner surfaces having different inner diameters, one of said annular inner surfaces of said rotating sleeve being formed with a stop rib movable on said first slideway area of said outer surface of said extension tube, the other one of said annular inner surfaces of said rotating sleeve being formed with a projection movable along said curved connecting shoulder of said extension tube.

11. The device for limiting swivel as claimed in claim 10, wherein, at each of said inner and outer axial ends of said curved connecting shoulder, said extension tube is formed with a stop edge for contact with said rib, and a recess for engagement with said projection, so as to maintain positioning of said projection of said rotating sleeve at said inner and outer axial ends of said curved connecting shoulder and so as to limit a rotational angle of said rotating sleeve relative to said extension tube.

12. The device for limiting swivel as claimed in claim 2, further comprising an outer housing having a hole formed therethrough, said swivel-limiting unit and said quick release unit being disposed within said outer housing such that said touch control button being disposed within said hole in said outer housing.

13. The device for limiting swivel as claimed in claim 2, wherein said base has a top surface that is formed with two guide rails, said movable plate being formed integrally with said touch control button and having two curved integral arms extending respectively and outwardly from two opposite sides thereof and serving as reed springs, said arms of said movable plate being in slidable contact with said guide rails, respectively, so as to guide movement of said movable plate on said base in a swivel, said arms biasing said movable plate to a position whereat said neck engages said narrow hole portion of said hole in said movable plate.

14. A device for limiting swivel of a wheel of a stroller, said stroller including a frame unit, said device for limiting swivel comprising:
   a fork adapted to be mounted with the wheel;
   a connecting seat adapted to be disposed fixedly on the frame unit;
   a limiting seat connected fixedly to said fork and disposed with said connecting seat; and
   a control member disposed on said connecting seat and operable to extend into said limiting seat so as to prevent rotation of said fork relative to said connecting seat, said connecting seat being tubular and having an annular outer surface that is formed with an extension tube, said control member including a locking rod movable within said extension tube between a locking position and a release position.

15. The device for limiting swivel as claimed in claim 14, wherein said control member further includes a locking rod movable within said extension tube between a locking position and a release position, a resilient member sleeved on said locking rod so as to bias said locking rod to said locking position to thereby prevent rotation of said fork relative to said connecting seat, and a rotating sleeve sleeved rotatably on said extension tube and operable to move said locking rod to said release position.

16. The device for limiting swivel as claimed in claim 15, wherein said fork has a connecting portion mounted with the wheel, and a retaining portion connected fixedly to said connecting portion, said limiting seat having a receiving space adapted to permit extension of said retaining portion of said fork, and a periphery formed with a limiting groove, said locking rod being inserted into said limiting groove in said limiting seat when said locking rod is disposed in said locking position, said locking rod being removed from said limiting groove in said limiting seat when said locking rod is disposed in said release position.

17. The device for limiting swivel as claimed in claim 15, wherein said locking rod is formed with a stop portion, said connecting seat having a hole and a stop surface, said extension tube extending into and fixed within said hole in said connecting tube, said resilient member being disposed between said stop portion of said locking rod and said stop surface of said connecting seat.

18. The device for limiting swivel as claimed in claim 15, wherein said extension tube is formed with an outer surface including a first slideway area, a second slideway area having an outer diameter smaller than that of said first slideway area, and a curved connecting shoulder defined between said first and second slideway areas and having opposite inner and outer axial ends, said rotating sleeve being formed with a pair of interconnected annular inner surfaces having different inner diameters, one of said annular inner surfaces of said rotating sleeve being formed with a stop rib movable on said first slideway area of said outer surface of said extension tube, the other one of said annular inner surfaces of said rotating sleeve being formed with a projection movable along said curved connecting shoulder of said extension tube.

19. The device for limiting swivel as claimed in claim 18, wherein, at each of said inner and outer axial ends of said curved connecting shoulder, said extension tube is formed with a stop edge for contact with said rib, and a recess for engagement with said projection, so as to maintain positioning of said projection of said rotating sleeve at said inner and outer axial ends of said curved connecting shoulder and so as to limit a rotational angle of said rotating sleeve relative to said extension tube.

20. A quick release unit for a stroller, said stroller including a frame unit, a wheel, a fork adapted to be mounted with the wheel and having a head, and a swivel-limiting unit including a connecting seat adapted to be disposed fixedly on the frame unit, said quick release unit comprising:
   a base disposed fixedly on said connecting seat; and
   a movable member disposed movably on said base and operable to move on said base so as to allow for removal of said fork from said swivel-limiting unit, said movable member including a touch control button operable to move horizontally on said base, and a movable plate driven by said touch control button to move horizontally on said base when said touch control button is operated;
   wherein said fork has a connecting portion mounted with the wheel, and a retaining portion connected fixedly to said connecting portion, said base having a hole for extension of said retaining portion of said fork therethrough, said hole having a narrow hole portion and a wide hole portion, said movable plate being biased to a position whereat said neck engages said narrow hole portion so as to prevent removal of said fork from said swivel-limiting unit, said touch control button being operable to move said movable plate on said base so as to engage said neck with said wide hole portion of said hole in said movable plate, thereby allowing for removal of said fork from said swivel-limiting unit.

21. The quick release unit as claimed in claim 20, wherein said base has a top surface that is formed with two guide rails, said movable plate being formed integrally with said touch control button and having two curved integral arms extending respectively and outwardly from two opposite sides thereof and serving as reed springs, said arms of said movable plate being in slidable contact with said guide rails, respectively, so as to guide movement of said movable plate on said base in a swivel, said arms biasing said movable plate to a position whereat said neck engages said narrow hole portion of said hole in said movable plate.

22. The device for limiting swivel as claimed in claim 21, wherein said base includes:
   a top wall;
   an annular surrounding wall extending integrally and downwardly from a periphery of said top wall and disposed around a portion of said connecting seat, said surrounding wall having an annular lower end edge formed with a notch that engages fittingly said extension tube of said connecting seat; and
   a guide block disposed fixedly on said top wall and having a tapered guiding portion;
   said movable member being configured as a clip defining a neck-confining space, which engages said neck and which has a wide portion sized to allow for movement of said head of said fork therethrough, and a narrow portion sized to prevent movement of said head of said fork therethrough, said tapered guiding portion of said guide block engaging fittingly a portion of said neck-confining space so as to bias said clip to a position whereat said neck engages said narrow portion of said neck-confining space so as to prevent removal of said fork from said connecting seat, said clip being operable to move on said base so as to engage said neck with said wide portion of said neck-confining space, thereby allowing for removal of said fork from said connecting seat.

23. The quick release unit as claimed in claim 20, further comprising an outer housing having a hole formed therethrough, said swivel-limiting unit and said quick release unit being disposed within said outer housing such that said touch control button is disposed within said hole in said outer housing.

24. A quick release unit for a stroller, said stroller including a frame unit, a wheel, a fork adapted to be mounted with the wheel and having a head, and a swivel-limiting unit including a connecting seat adapted to be disposed fixedly on the frame unit, said quick release unit comprising:
   a base disposed fixedly on said connecting seat; and
   a movable member disposed movably on said base and operable to move on said base so as to allow for removal of said fork from said swivel-limiting unit, said movable member including a touch control button operable to move horizontally on said base, and a movable plate driven by said touch control button to move horizontally on said base when said touch control button is operated;
   wherein said hole has a narrow hole portion and a wide hole portion, said quick release unit further including a curved reed spring disposed between said base and said movable plate so as to bias said movable plate to a position whereat said neck engages said narrow hole portion of said hole in said movable plate, said base having a top surface that is formed with two spaced-apart parallel guide rails, said movable plate being disposed between said guide rails and having two opposite wing portions in slidable contact with said guide rails, respectively, so as to guide movement of said movable plate on said base along a direction.

25. The quick release unit as claimed in claim 24, further comprising an outer housing having a hole formed therethrough, said swivel-limiting unit and said quick release unit being disposed within said outer housing such that said touch control button is disposed within said hole in said outer housing.

* * * * *